Patented May 15, 1928.

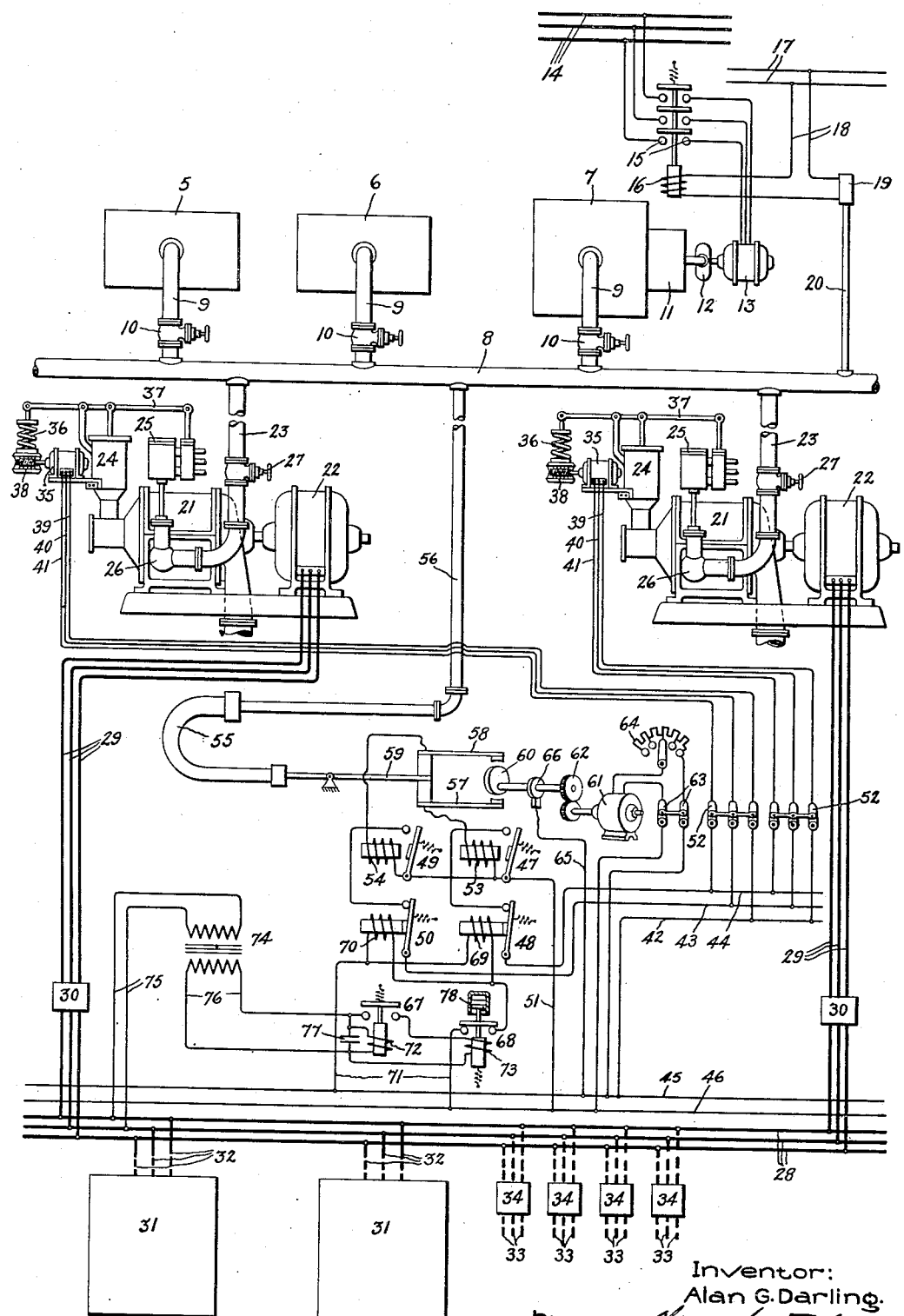

1,670,063

UNITED STATES PATENT OFFICE.

ALAN G. DARLING, OF SCHENECTADY, NEW YORK, ASSIGNOR TO GENERAL ELECTRIC COMPANY, A CORPORATION OF NEW YORK.

LOAD-CONTROL SYSTEM.

Application filed June 30, 1926. Serial No. 119,773.

The present invention relates to a load control system for an electric power plant operating with elastic fluid prime movers, and has for its object the provision of an improved system of that character which permits the plant in which it is embodied to fully utilize the waste heat energy in certain forms of cheap fuel resulting as a by-product from industrial operations, in the generation of motive fluid for the prime movers, while said plant is interconnected with other sources of electrical energy in a power supply system.

The larger quantities of waste heat, or waste material capable of generating heat hereinafter referred to as waste heat energy, resulting as a by-product from large scale industrial operations, such as copper smelting or lumber production for example, provide sources of energy of considerable magnitude and value in connection with existing power systems, particularly hydro-electric systems, which depend upon a certain water storage capacity for power during dry seasons.

For such system in particular, the waste heat energy from certain large scale industrial operations may be made to provide supplementary power in such a manner that expensive stand-by plants, as ordinarily provided, may be obviated, while permitting the proper storage and economical utilization of the water power. The same advantages accrue to other power systems, for example, those embodying fuel burning plants, since the use of properly controlled waste heat energy permits cheap power to be substituted for more expensive power.

As an example of a typical power plant and interconnected power system, to which the load control system of the present invention is adapted, a steam turbo-generator plant provided with a load control system embodying the invention and a connected hydro-electric system is diagrammatically illustrated in the figure shown in the accompanying drawing, and for a further consideration of what is believed to be novel and the invention, attention is now directed to said drawing, the description thereof and the appended claims.

Referring to the drawing, 5, 6 and 7 are steam boilers, representing any suitable elastic fluid generators for a power plant, connected with a steam main 8 for the plant through conduits 9 and valves 10, the latter serving to isolate an individual boiler from the main when said boiler is not in operation.

Boilers 5 and 6 represent any desired number of main boilers for the plant and may be considered to operate with cheap fuel such as waste heat from copper smelting operations for example. They supply steam to main 8 in accordance with the supply of waste heat, a greater volume of waste heat causing said boilers to deliver a proportionally greater volume of steam and vice versa.

Boiler 7 is an auxiliary or reserve boiler, and is maintained in an operating condition at all times whereby it may be put into full operation without delay to take up the steam load in case of partial or total loss of waste heat supply to the main boilers 5 and 6. Hence in the present example this boiler presents any suitable boiler capacity for carrying the station load in energy and is preferably but not necessarily arranged for oil firing as indicated. Boiler 7 is put into full operation in the usual manner, for example, by starting an auxiliary apparatus indicated by a blower 11 and an oil pump 12 driven by an electric motor 13.

The motor is supplied with current from mains indicated at 14 through a suitable starting switch or contactor 15. The contactor is electromagnetically controlled by a solenoid magnet 16 with which it is connected. The solenoid is energized to close the contactor 15 from direct current mains indicated at 17, through a control circuit 18 in which is connected a pressure-responsive device or switch 19 of any suitable construction.

The pressure-responsive switch is connected with steam main 8 by a pressure pipe 20 whereby it is made responsive to boiler pressure and operates to close the control circuit when the boiler pressure falls below a certain predetermined low value. This causes contactor 15 to close and starts motor 13 whereby the boiler is put into operation. By this arrangement the auxiliary boiler is placed under control of a pressure-responsive device connected with the steam main or with the main boilers and comes into operation automatically to maintain a certain normal boiler pressure in main 8. By this method of operation the more expensive oil fuel is conserved for emergency use.

Any suitable number of turbo-generators or prime-mover units may be provided in the power plant, depending upon the normal boiler capacity and in turn upon the waste heat energy available. In the present example, two steam turbo-generator units are shown, 21 being the turbine of each unit and 22 being the generator.

The turbines are supplied with steam through supply conduits 23 connected with main 8 and are controlled by suitable operating or speed governors 24 which operate in connection with the usual valve gears 25 and throttle valves 26. The governors operate, as is well known, to open the throttle valves in response to decreased speed accompanying increased load and vice versa whereby a certain substantially normal speed is maintained with varying load. Each turbine is provided with a normally open valve 27 by the closure of which it may be cut off from the steam main 8 when not in operation.

The generators are of the usual three-phase alternating-current type and are connected with the three-phase plant output busbars or mains 28 by leads 29 in which are located suitable oil switches, indicated at 30, for disconnecting the generators from said mains when their respective turbines are not in operation. Other auxiliary apparatus ordinarily provided in connection with the generators and the electrical end of the plant, such as transformers and the like, are not shown, since the same do not concern the invention or the operation of the plant in accordance therewith.

The plant is interconnected with other sources of electric power indicated at 31, through connecting lines indicated at 32 whereby the plant, that is, generators 22, operate in parallel therewith to supply a common load provided in connection with feeder lines indicated at 33 and here shown connected to mains 28. Each feeder line is provided with means such as a suitable oil switch, indicated at 34, for disconnecting it from mains 28.

Mains 28, feeder lines 33, lines 32 and sources of power 31, together with the generating equipment of the plant shown, represent an interconnected power system. The sources of power indicated at 31 may be taken to represent power plants operating with fuel which, because of its relative cost or because its supply is variable, must be conserved. By way of example, 31 may be considered more specifically to represent hydro-electric power plants. With such plants the amount of available water power tends to vary throughout the year and necessitates careful loading of such plants in order to maintain a certain water storage for use at peak load periods and during the dry seasons of the year.

The usual elastic fluid prime mover generator unit, such as the steam turbo-generator units shown, in connection with such a power system, tend to hold constant speed with varying load, that is, to take elastic motive fluid or steam in accordance with the load, and to accept the variations in the load on the system to which their generators are connected, regardless of the steam pressure. This is because the average elastic fluid prime mover governor is inherently close in regulation, being considerably more so than governors for hydro-electric prime mover units, for example.

Accordingly, in addition to the automatic control for the auxiliary boiler and the turbine operating governors above described, automatic control means is provided in the waste heat power plant to permit the turbo-generators to take steam or elastic fluid and accept load in accordance with the waste heat boiler output, that is, in accordance with the supply of waste heat energy, whereby all of the waste heat energy may be utilized and the more expensive fuel or water power energy may be conserved in the other plants of the system.

In the present example this control means is made responsive to the boiler pressure since the latter is at present considered to be the most convenient and practical indication of waste heat energy, although any operating condition of the plant indicative of the quantity of available waste heat energy may be utilized to actuate the control means for the prime movers.

This load control means may be of any suitable type within limits hereinafter pointed out and is preferably such that it is readily adapted to a prime mover without change in the operating governor arrangement thereof, as shown in the present example, wherein the turbine governor mechanisms are provided with the usual and well known synchronizing motors indicated at 35, which control the load setting of the respective turbines through a suitable mechanism, and here represented by compressible springs 36 which are connected with the governor arms 37 and subjected to varying degrees of compression by the motors 35 through worm gearings 38.

The synchronizing motors are of the usual split field type, as indicated by the three connecting leads thereto, comprising a common lead 39 and two reversing leads 40 and 41. The arrangement is such that lead 40 is energized along with common lead 39 when it is desired to decrease the load on the turbine, that is, to decrease the steam consumption in response to decreased waste heat energy, and lead 41 is energized along with common lead 39 when it is desired to increase the load on the turbine, that is, to increase the steam consumption to utilize increased waste heat energy.

Instead of being individually controlled by normally operated controls at a central switchboard as in an ordinary power plant, motors 35 are connected for joint operation to a common load control bus or circuit comprising circuit wires 42, 43 and 44 corresponding to and respectively connected with leads 39, 40 and 41. The control bus or circuit is in turn energized from a pair of direct current supply mains 45 and 46 through suitable relays 47, 48, 49 and 50.

The contacts of relays 47 and 48 are connected in series between supply main 46 and control bus wire 44, while the contacts of relays 49 and 50 are similarly connected in series between the same supply main and control bus wire 43, a common connecting lead wire 51 being provided for said series connections with supply main 46. Control bus wire 42 is the common wire of the control bus and is connected directly with the remaining supply main 45. In leads 39, 40 and 41 for each motor are disconnecting switches 52 by which the individual turbine control may be cut off from the control bus.

The actuating coils of relays 47 and 49, indicated at 53 and 54 respectively, are arranged to be controlled by a contact-making pressure responsive device 55 which is connected with steam main 8 by a pressure pipe 56. The device of the present example is in the form of a Bourdon tube which actuates a pair of spaced, insulated contacts 57 and 58 carried on the end of a pivoted arm 59 in contacting relation to a third or common cam-shaped contact 60. This last named contact is continuously rotated by a motor 61 through a gearing 62. The motor receives energy from supply mains 45 and 46 through a suitable switch 63 and speed controlling rheostat 64.

The rotating contact is connected with supply main 45 through a lead wire 65 and a brush and slip-ring arrangement 66, and depending upon the position of the spaced contacts 57 and 58 in relation to it, completes a circuit from said main through the one or the other of the contacts 57 or 58 and the one or the other of coils 53 or 54 to the other supply main 46. To provide this circuit arrangement, coils 53 and 54 are, on one side, connected to supply main 46 through lead wire 51 and on the other side to contacts 57 and 58 respectively.

The pressure responsive device operates to close contacts 57 and 60 when the boiler pressure tends to increase above a certain predetermined normal value or when it reaches a certain high limit, and to close contacts 58 and 60 when said pressure tends to decrease below said normal value or when it reaches a certain low limit, thereby actuating relay 47 in response to the higher pressure and relay 49 in response to the lower pressure.

Relay 47 controls bus wire 44 and lead wires 41 to the synchronizing or load control motors of the various turbines while relay 49 controls bus wire 43 and the lead wires 40 to said motors, hence by this arrangement the pressure responsive device controls said motors in a manner to cause the turbines to take more steam when the boiler pressure tends to increase and to cause the turbines to take less steam when the boiler pressure tends to decrease. The turbines are thereby controlled in accordance with the supply of waste heat and are operated to utilize the steam generated thereby in accordance with the boiler pressure, which is used as a convenient and practical indication of the waste heat supply as hereinbefore mentioned.

Relays 47 and 49 also provide in effect a secondary control means for the pressure responsive means so that the necessarily delicate and sensitive contacts of said device are not called upon to carry the operating current for the synchronizing or load control motors or like apparatus, which current may reach a relatively high value with a plurality of jointly controlled turbines or prime movers in operation.

The rotating cam-shaped contact 60 and the motor means for driving it represents any suitable means in connection with the prime mover load control apparatus for preventing hunting action or over travel of the load adjusting means, in this case, of the synchronizing motors, when actuated in response to pressure changes. In the present example, the rotating contact moves into and out of contact with either one of the swinging or movable contacts when the latter is moved adjacent to it for pressure correction. By this means the correction is proportioned to the change in pressure, is effected in short steps, and is less liable to over-correction in either direction and consequent over-travel and wear of the governor parts. The rate at which the corrective steps are taken is regulated by the rheostat 64.

It will be seen that the load control arrangement for the plant is independently responsive to the waste heat energy supply, being actuated by boiler pressure, and is independent in operation of the operating or speed governor means for the prime movers whereby in itself, it provides normally complete governing means. However the operating or speed governing means are retained, as shown in the present example, for the reason that at certain times, such as during the dry seasons of the year in the system under consideration, the prime movers of the plant are required to carry a large percentage of the total load of the power system and hence exert a relatively heavy flywheel or speed governing effect thereon; that is, the prime movers of the plant tend to regulate the frequency of the system when carrying a major portion of the load and must therefore operate at constant speed.

Thus, in the arrangement provided, each governing means, since the load control means may be regarded as such, operates independently of the other. Each of said governing or control means has its own important function and must be dominant at certain times in the control of the prime movers to permit the plant to operate properly and effectively in connection with a power system in which reliability of service is an important factor.

For normal operation of the system thus far described, the prime movers operate to supply energy in accordance with the supply of waste energy under the dominating control of the load control system which is responsive to boiler pressure and which indicates to the prime movers the proper load setting to absorb that energy, and the speed governors maintain substantially constant speed at that load setting or rate. Under this normal operating condition the other sources of energy, such as hydro-electric stations 31, take the additional load of the system over that supplied by the waste heat operated plant.

However, emergency or abnormal operation of such a system is not infrequent and may be occasioned by loss of hydro-electric or other power, by abnormal load, or by loss or reduction in the supply of waste heat, accompanied by a drop in the boiler pressure and in the frequency of the power system. In case the emergency condition is caused by loss of hydro-electric or other power or heavy load on the system, the system will fail to maintain the speed or frequency of the generators 22 and the turbines will tend to accept the load in the regular manner under control of their speed governors. The speed which the governors will tend to establish and maintain will depend upon the particular setting of the governors at the instant of failure of the hydroelectric power or of the application of abnormal load if the boiler pressure remains normal.

If the waste heat steam generating capacity is not then sufficient to maintain normal boiler pressure the latter will fall and along with it, the frequency of the power system because of the accompanying decreased speed of the turbines.

With a drop in boiler pressure it will be seen that turbines, under the dominating load control means tend to take correspondingly less load, until the boiler pressure is restored by increased supply of waste heat energy or by the auxiliary boiler arrangement, which is automatically put into operation in response to the decreased pressure. The auxiliary boiler arrangement is relatively slow in coming into full operation whereinit may be used to capacity, hence it cannot be made to serve as an aid in meeting immediate emergency low boiler pressure conditions.

It is under such conditions that the speed or operating governors may provide an effective and dominating control, and are put into operation for this purpose by a frequency responsive means connected with the power system.

In the present example, the frequency responsive means operates in connection with relays 48 and 50 to open the connection between load control relays 47 and 49 and the load control circuit or bus 42—43—44, and comprises a relay 67 which is responsive to a certain lower than normal frequency and a time delay relay 68 which operates when energized for a certain length of time.

The actuating coils of relays 48 and 50 are indicated at 69 and 70 respectively and are connected in parallel for simultaneous operation to supply mains 45 and 46 through a circuit 71 in which is included the contacts of time delay relay 68. Relays 48 and 50 are thus placed under control of relay 68 which is normally closed. Hence actuating coils 69 and 70 of relays 48 and 50 are normally energized whereby said relays are normally maintained in the closed position.

Relays 67 and 68 are provided with actuating coils 72 and 73 respectively which are connected with the alternating current output bus bars 28 and the power system through a suitable step-down transformer 74 and primary and secondary currents 75 and 76. The contacts of relay 67 are connected in circuit with actuating coil 73 whereby said coil is energized by operation of relay 67. Actuating coil 72 is directly connected with the alternating current supply from mains 28, that is, with secondary circuit 76 whereby it is energized at all times from the power system and is made responsive to a certain lower than normal frequency, for example, a frequency a few per cent below normal, by suitable means such as a condenser 77 in shunt with coil 72. This represents any suitable frequency responsive control for the system and is the usual arrangement in a frequency responsive relay.

Relay 68 responds to closure of the contacts of frequency relay 67 after a limited time delay, for example, after a period of a few minutes has elapsed, and is rendered so responsive in the present example by a suitable dashpot 78 which retards the operation of the relay when coil 73 is energized.

The operation of the frequency responsive means and time delay means is as follows:—

When the frequency of the power system to which the prime mover generators are connected falls to a certain subnormal value, the frequency responsive relay 67 is actuated and closes the circuit through coil 73 of time delay relay 68. This relay begins to operate against the action of its dash-pot 78 and if the frequency remains low over a certain period, for example, a few minutes, it reaches a point in its operation wherein its opens the energizing circuit for relays 48 and 50. These relays in turn open the load control circuits between the pressure responsive device and the prime movers.

This places the prime movers under control of their speed or operating governors alone at the setting imposed by the load control means at the time the load control circuit is opened, and if the low frequency is not caused by low boiler pressure but to overload on the system or loss of hydro-electric power, the governors will operate in the normal way to open the throttles and tend to hold a speed corresponding to said setting of the governors, thereby giving the system all the energy that the boilers can provide at that speed until the frequency returns to normal. Upon the return to normal frequency relay 67 reopens, whereupon relay 68 closes and causes relays 48 and 50 to close, thereby placing the prime movers under control of the pressure responsive or load control means.

If the boiler pressure is low, the speed or operating governors tend to hold the predetermined speed at the governor setting established by the load control means just prior to the time when it was cut off from control of the prime movers following a drop in frequency as above described. However this is an emergency operating condition and the speed maintained is dependent upon the boiler pressure, the speed being reduced in proportion as the demand exceeds the supply from the boilers. The auxiliary boiler then comes into operation in response to operation of pressure responsive device 19 and tends to bring the boiler pressure back to normal. Normal operation will then be resumed when the frequency of the system returns to normal.

From the foregoing description it will be seen that the plant is entirely automatic in operation and is adapted to meet normal and emergency operating conditions which are common in connection with the usual power system such as that represented in the present example.

Thus a load control system embodying the invention provided for utilizing all of the available waste heat energy in a plant while said plant is interconnected with other sources of electrical energy in a system providing dependable power. It provides for the control of plants operating with waste heat energy from industrial operations and the like, and permits the output of such plants to be absorbed in a power system and to be therein utilized more economically than has heretofore been possible.

While the invention has been illustrated and described in connection with what is at present believed to be its best embodiment, it should be understood that it is not limited thereto and may be carried out by other means.

What I claim as new and desire to secure by Letters Patent of the United States, is:—

1. The combination with an elastic fluid prime mover, an electric generator driven thereby and an operating governor for the prime mover, of means for generating elastic fluid from waste heat energy, means for supplying such elastic fluid to the prime mover, a control means for the prime mover which is responsive to changes in the supply of waste heat energy, an alternating current power system with which the generator is connected, and frequency-responsive means connected with the power system for interrupting the operation of said control means in connection with the prime mover when the frequency of said system falls to a certain lower than normal value.

2. The combination with an elastic fluid prime mover, an electric generator driven thereby and an operating governor for the prime mover, of means for generating elastic fluid from waste heat energy, means for supplying such elastic fluid to the prime mover, a control means for the prime mover which is responsive to changes in the supply of waste heat energy, an alternating current power system with which the generator is connected, frequency-responsive means connected with the power system for interrupting the operation of said control means in connection with the prime mover when the frequency of said system falls to a certain lower than normal value, an auxiliary elastic fluid generating means for the prime mover, and means responsive to the pressure of the elastic fluid supply connected with and controlling said auxiliary elastic fluid generating means.

3. The combination with an elastic fluid prime mover, an electric generator driven thereby and an operating governor for the prime mover, of an elastic fluid generator operating with waste heat energy to supply the prime mover, means responsive to changes in the pressure of the elastic fluid supply for controlling the load taken by the prime mover independently of the operating governor, an auxiliary elastic fluid generator provided with an operating control means responsive to the elastic fluid supply pressure, an alternating current power system with which the generator is connected, and means including a frequency-responsive device connected with said power system for interrupting the operation of the load controlling means in connection with the prime mover when the frequency of said system falls to a certain lower than normal value.

4. The combination with an elastic fluid prime mover, an electric generator driven thereby and an operating governor for the prime mover, of an elastic fluid generator operating with waste heat energy to supply the prime mover, electrically operated means in connection with the prime mover for controlling the load taken thereby, a control circuit for said load control means, a pair of relays in said circuit, a contact-making pressure-responsive device actuated by elastic fluid supply pressure and connected with said relays to control the same, a second pair of relays in said load control circuit, a time delay relay controlling said relays, a frequency-responsive relay controlling said time delay relay, an alternating current power system with which the generator is connected, means providing a circuit connecting the frequency-responsive relay with said power system, whereby said relay is responsive to changes in the frequency of said system, an auxiliary elastic fluid generating means, and means responsive to the elastic fluid supply pressure controlling said last-named generating means.

5. The combination with an alternating current power system including interconnected power generating plants, of a power plant adapted for the conversion of by-products from industrial processes into power, comprising boilers operating with such by-products as fuel and an auxiliary boiler, steam turbines connected with said boilers, electric generators driven by said turbines and connected with said power system, operating governors for said turbines, load control means for regulating the turbines independently of the operating governors whereby the load accepted by said turbines may be varied, an electrical control circuit connected with said load control means through which circuit said means is actuated, means responsive to the boiler pressure connected with said circuit for actuating said control means, means in said circuit for interrupting said connection with the pressure-responsive means, and means responsive to changes in the frequency of the power system connected with said last-named means to actuate the same in response to a certain subnormal frequency.

6. The combination with an alternating current power system including interconnected power generating plants, of a power plant adapted for the conversion of by-products from industrial processes into power, comprising boilers operating with such by-products as fuel and an auxiliary boiler, steam turbines connected with said boilers, electric generators driven by said turbines and connected with said power system, operating governors for said turbines, means responsive to decreased boiler pressure connected with said auxiliary boiler for putting the same into operation, load control means for regulating the prime movers independently of the operating governors whereby the load accepted by said turbines may be varied, an electrical control circuit connected with said load control means through which circuit said means is actuated, means responsive to the boiler pressure connected with said circuit for actuating said control means, means in said circuit for interrupting said connection with the pressure-responsive means, means responsive to changes in the frequency of the power system connected with said last-named means to actuate the same in response to a certain subnormal frequency, and means in connection with the frequency-responsive means for delaying its action on the interrupting means.

7. In a power plant, the combination with a plurality of turbo-generators of the alternating-current type having operating governors and synchronizing motors in connection therewith and a power supply system including sources of power to which said turbo-generators are connected, of a common control bus for said synchronizing motors, a plurality of boilers for supplying steam to the turbo-generators, certain of said boilers being heated by waste products from industrial operations and certain other of said boilers being in reserve, means responsive to decreased boiler pressure connected with said reserve boilers for putting the same into operation when said pressure reaches a certain subnormal value, a contact-making pressure-responsive device connected with the boilers to receive pressure therefrom and with the control bus for the synchronizing motors to control the latter in response to changes in boiler pressure whereby the turbo-generators accept load in response to the supply of steam, means interposed between the control bus and the pressure-responsive device for disconnecting the latter from said bus, and a frequency-responsive device connected with and controlling said disconnecting means, said frequency-responsive device being connected with the power supply system and operating in response to a certain subnormal frequency of said power supply system.

8. The combination with an elastic fluid turbine, a generator driven by the turbine, regulating valve means for the turbine, and means other than a speed governor for fixing the speed of the turbine, of means for supplying elastic fluid to the turbine, means controlled by the pressure of the elastic fluid for positioning said valve means whereby the turbine will be caused to utilize all the elastic fluid available from said supply means, and means for rendering said pressure-controlled means ineffective in case said speed-fixing means fails.

In witness whereof, I have hereunto set my hand this 29th day of June, 1926.

ALAN G. DARLING.

CERTIFICATE OF CORRECTION.

Patent No. 1,670,063.             Granted May 15, 1928, to

ALAN G. DARLING.

It is hereby certified that error appears in the printed specification of the above numbered patent requiring correction as follows: Page 1, line 26, for the word "system" read "systems" and line 77, for the word "energy" read "emergency"; and that the said Letters Patent should be read with these corrections therein that the same may conform to the record of the case in the Patent Office.

Signed and sealed this 19th day of June, A. D. 1928.

(Seal)

M. J. Moore,
Acting Commissioner of Patents.